(12) United States Patent
Dome et al.

(10) Patent No.: US 10,628,251 B2
(45) Date of Patent: Apr. 21, 2020

(54) INTELLIGENT PREVENTATIVE MAINTENANCE OF CRITICAL APPLICATIONS IN CLOUD ENVIRONMENTS

(71) Applicant: AT&T Intellectual Property I, L.P., Atlanta, GA (US)

(72) Inventors: George Dome, Tinton Falls, NJ (US); Dean Bragg, Toms River, NJ (US); John Ng, Morganville, NJ (US); John Oetting, Zionsville, PA (US); Chuxin Chen, San Francisco, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 239 days.

(21) Appl. No.: 15/715,589

(22) Filed: Sep. 26, 2017

(65) Prior Publication Data
US 2019/0095265 A1 Mar. 28, 2019

(51) Int. Cl.
| G06F 11/00 | (2006.01) |
| G06F 11/07 | (2006.01) |
| H04L 12/24 | (2006.01) |
| G06F 11/34 | (2006.01) |
| G06F 9/455 | (2018.01) |
| H04L 12/26 | (2006.01) |

(52) U.S. Cl.
CPC ........ *G06F 11/079* (2013.01); *G06F 9/45558* (2013.01); *G06F 11/3466* (2013.01); *H04L 41/069* (2013.01); *H04L 41/0853* (2013.01); *H04L 41/142* (2013.01); *H04L 41/147* (2013.01); *G06F 2009/45591* (2013.01); *H04L 41/0654* (2013.01); *H04L 41/0893* (2013.01); *H04L 41/16* (2013.01); *H04L 41/5009* (2013.01); *H04L 43/04* (2013.01); *H04L 43/08* (2013.01); *H04L 43/0817* (2013.01)

(58) Field of Classification Search
CPC .. G06F 11/008; G06F 11/079; G06F 11/3409; G06F 11/3452; G06F 11/3602; G06F 11/3604
USPC ...................................................... 714/37, 25
See application file for complete search history.

(56) References Cited

U.S. PATENT DOCUMENTS

| 9,489,647 B2 | 11/2016 | Martinez et al. |
| 9,568,909 B2 | 2/2017 | Lawson et al. |
| 9,608,933 B2 | 3/2017 | Emaru |

(Continued)

*Primary Examiner* — Sarai E Butler
(74) *Attorney, Agent, or Firm* — Hartman & Citrin LLC

(57) ABSTRACT

An intelligent preventative maintenance architecture for maintaining a plurality of cloud components operating within a cloud computing environment is disclosed. The architecture can perform a predictive failure analysis that monitors health of at least a portion of the plurality of cloud components that hosts a mission critical application. The predictive failure analysis receives sensor data that includes environmental data associated with environmental characteristics of the cloud computing environment and cloud component data associated with operational characteristics of at least a portion of the plurality of cloud components operating within the cloud computing environment. The predictive failure analysis analyzes the sensor data to detect an abnormal pattern within the sensor data, determines a root cause of the abnormal pattern, and predicts a probability of a failure of at least one cloud component of the plurality of cloud components.

20 Claims, 13 Drawing Sheets

(56) References Cited

U.S. PATENT DOCUMENTS

| | | | |
|---|---|---|---|
| 9,626,526 B2 | 4/2017 | Hadar et al. | |
| 9,690,575 B2 | 6/2017 | Prismon et al. | |
| 2012/0303807 A1* | 11/2012 | Akelbein | G06F 11/3006 709/224 |
| 2013/0031424 A1* | 1/2013 | Srivastava | G06F 11/008 714/E11.2 |
| 2013/0145433 A1* | 6/2013 | Akelbein | G06F 21/30 726/4 |
| 2014/0172954 A1 | 6/2014 | Salsburg et al. | |
| 2015/0170081 A1 | 6/2015 | Bothello et al. | |
| 2015/0347907 A1 | 12/2015 | Mathew et al. | |
| 2016/0048408 A1* | 2/2016 | Madhu | G06F 11/1458 718/1 |
| 2016/0259659 A1 | 9/2016 | Tang | |
| 2017/0053242 A1 | 2/2017 | Ayyaswami | |
| 2017/0207968 A1 | 7/2017 | Eicken et al. | |
| 2017/0212724 A1* | 7/2017 | Howard | G06F 13/4027 |
| 2018/0306476 A1* | 10/2018 | Brady | F25B 49/005 |

* cited by examiner

INTELLIGENT PREVENTATIVE MAINTENANCE OF CRITICAL APPLICATIONS IN CLOUD ENVIRONMENTS

BACKGROUND

Cloud environments employ numerous cloud components that have a limited life expectancy. Cloud service providers that deploy and manage such cloud environments have applied numerous approaches to replace cloud components prior to component failure. One traditional replacement approach includes scheduled component replacement, whereby cloud components are replaced at regular intervals. While this approach can greatly reduce the potential for failure, this approach is costly because otherwise healthy cloud components are replaced before replacement is required. Another traditional replacement approach is based upon a policy of replacing a rack of cloud components when certain component failures exceed a fixed failure rate threshold. Both the scheduled replacement approach and the fixed failure rate threshold approach put mission critical applications at risk, and force a lower utilization percentage to ensure that all mission critical applications can be sustained during failures in the cloud environment.

SUMMARY

Concepts and technologies disclosed herein are directed to intelligent preventative maintenance of critical applications in cloud environments. According to one aspect of the concepts and technologies disclosed herein, an intelligent preventative maintenance architecture for maintaining a plurality of cloud components operating within a cloud computing environment is disclosed. The intelligent preventative maintenance architecture can include at least one processor and memory having a plurality of logical frameworks stored thereon. The plurality of logical frameworks can include a preventative framework that includes preventative framework instructions that, when executed by the processor, cause the processor to perform a predictive failure analysis. The predictive failure analysis can monitor the health of at least a portion of the plurality of cloud components operating within the cloud computing environment, wherein at least the portion of the plurality of cloud components hosts a mission critical application. The predictive failure analysis can receive sensor data from an engineering framework of the plurality of logical frameworks. The sensor data can include environmental data associated with one or more environmental characteristics of the cloud computing environment. The sensor data can alternatively or additionally include cloud component data associated with operational characteristics of at least a portion of the plurality of cloud components operating within the cloud computing environment. The predictive failure analysis can analyze the sensor data to detect an abnormal pattern within the sensor data. The predictive failure analysis can then determine a root cause of the abnormal pattern, and predict a probability of a failure of at least one cloud component of the plurality of cloud components.

In some embodiments, the intelligent preventative maintenance architecture can determine the root cause of the abnormal pattern based, at least in part, upon a big data analytics process. In some embodiments, the intelligent preventative maintenance architecture can determine the root cause of the abnormal pattern based, at least in part, upon a machine learning process.

In some embodiments, the preventative framework instructions can, when executed by the processor, cause the processor to perform a proactive operational adjustment to the at least one cloud component of the plurality of cloud components based, at least in part, upon the root cause of the abnormal pattern and the probability of the failure. The intelligent preventative maintenance architecture also can create a policy that governs an initial homing and placement of a new mission critical application to be hosted by at least a further portion of the plurality of cloud components operating within the cloud computing environment based, at least in part, upon a mission critical factor associated with the new mission critical application. The intelligent preventative maintenance architecture can fine tune the policy based, at least in part, upon results of a failure history analysis and the machine learning process. The intelligent preventative maintenance architecture can determine a maintenance schedule for the further portion of the plurality of cloud components operating within the cloud computing environment.

In some embodiments, the preventative framework instructions can, when executed by the processor, cause the processor to perform preemptive mission critical application hardening. The preemptive mission critical application hardening can include moving the mission critical application from the portion of the plurality of cloud components to a further portion of the plurality of cloud components. The preemptive mission critical application hardening alternatively can include moving the mission critical application from the portion of the plurality of cloud components operating within the cloud computing environment to a portion of a further plurality of cloud components operating within a further cloud computing environment. The preemptive mission critical application hardening can include redeploying the mission critical application to at least a further portion of the plurality of cloud components operating within the cloud computing environment. Redeployment of the mission critical application can be performed within a specified maintenance window.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The concepts and technologies disclosed herein provide a new approach to cloud component maintenance that is flexible and adaptive to support the intricacies of different cloud environments and to provide an optimal balance between maximizing the availability of mission critical applications and minimizing the cost of cloud component replacement. In addition, the concepts and technologies disclosed herein streamline maintenance operations and integrate with other cloud environment frameworks to achieve end-to-end automation for maintenance of mission critical applications.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
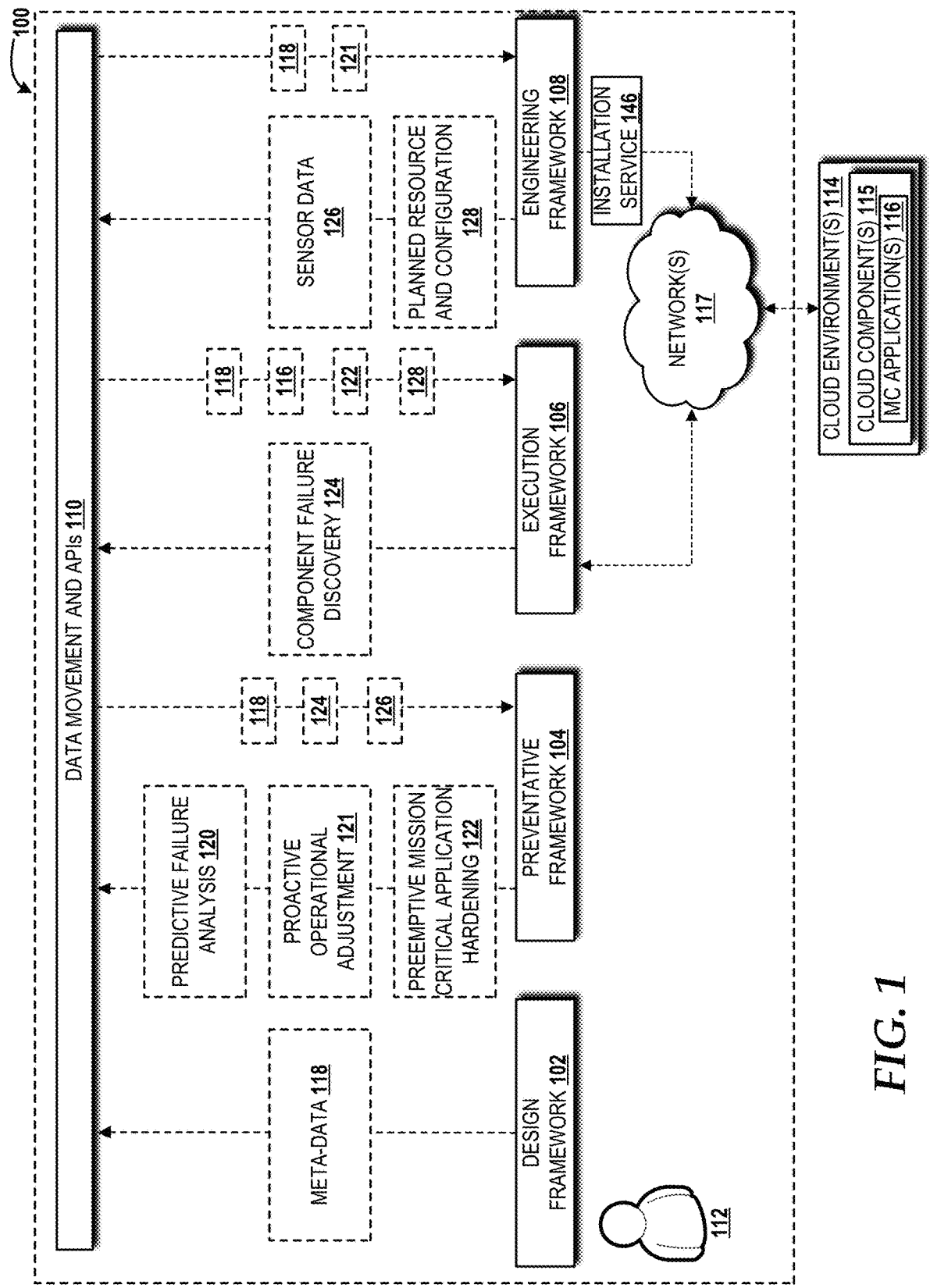
FIG. 1 is a block diagram illustrating aspects of an operating environment capable of implementing aspects of the embodiments presented herein.

Referring now to FIG. 1, aspects of an intelligent preventative maintenance architecture 100 capable of implementing aspects of the embodiments presented herein will be described. The intelligent preventative maintenance architecture 100 is designed to be flexible for adapting to different cloud environments. The intelligent preventative maintenance architecture 100 provides an optimal balance between maximizing the availability of mission critical applications while minimizing replacement costs for cloud components. In addition, the intelligent preventative maintenance architecture 100 streamlines maintenance operations and integrates with other cloud environment frameworks to achieve an end-to-end automation of maintenance for mission critical applications. The illustrated intelligent preventative maintenance architecture 100 includes a plurality of frameworks to support various aspects of intelligent preventative maintenance of critical applications. In particular, the intelligent preventative maintenance architecture 100 includes a design framework 102, a preventative framework 104, an execution framework 106, and an engineering framework 108. Interactions among these frameworks 102, 104, 106, 108 can be handled via a set of data movement protocols and application programming interfaces ("APIs") 110. By way of example, and not limitation, the set of data movement protocols and APIs 110 can be provided, at least in part, as Data Movement as a Platform ("DMaaP") that provides high performing and cost effective data movement data services that transports and processes data from any source to any target with the format, quality, security, and concurrency required to service business and customer needs. In this example, the DMaaP can include a set of common services provided by the Open Network Automation Platform ("ONAP"), including a message router, data router, and a data bus controller. Other DMaaPs can be implemented to perform similar operations for the concepts and technologies disclosed herein. In some embodiments, the frameworks 102, 104, 106, 108 are logical frameworks embodied as software that includes instructions that can be executed, at least in part, by one more processors of one or more computing systems, including systems operating as part of the same or a different cloud environment.

The design framework 102 supports a collaborative and iterative approach for users 112 to design recipes, templates, policies, models, analytics, and/or algorithms for one or more cloud environments 114, one or more cloud components 115 operating in the cloud environment(s) 114, one or more mission critical ("MC" in FIG. 1) application(s) 116 capable of being executed, at least in part, by at least a portion of the cloud component(s) 115 operating within the cloud environment(s) 114, and/or one or more network configurations for one or more networks 117 with which the cloud environment(s) 114 are in communication. As used herein, a "recipe" includes a structured set of data that expresses relationships of entities, processes, rules/policies, and/or other relationships used to define configurable management behavior. As used herein, a "template" includes a portal form to capture required parameters, additional parameters, composition graph/type/process, capability and management APIs, capability policies, and other configurable data parameters disclosed herein. As used herein, a "policy" can include a modifiable rule, assertions, and/or conditions under which to enable real-time decision making on corrective actions and configuration changes in the intelligent preventative maintenance architecture 100. By way of example, policies can be implemented via policy engines such as Drools or XACML. As used herein, a "model" includes data attributes of objects, the relationships amongst the objects, and the associated management methodologies (e.g., processes, analytics, and policies). As used herein, an "algorithm" includes step-by-step operations to perform calculations, data processing, and automated reasoning. As used herein, "analytics" can be implemented via an analytics engine/application that analyzes the collected data (including analysis of data collected over time) and detects policy violations by discovering temporal, spatial, or geographical patterns in the data.

The cloud environment(s) 114 can provide, at least in part, any type of cloud service or combination of cloud services, such as, for example, Infrastructure as a Service, Platform as a Service, Storage as a Service, and/or Software as a Service. The concepts and technologies disclosed herein can be extended to other cloud-based services known to those skilled in the art. Moreover, one skilled in the art will appreciate the applicability of the concepts and technologies disclosed herein and variations thereof to future cloud services.

Figure 2:
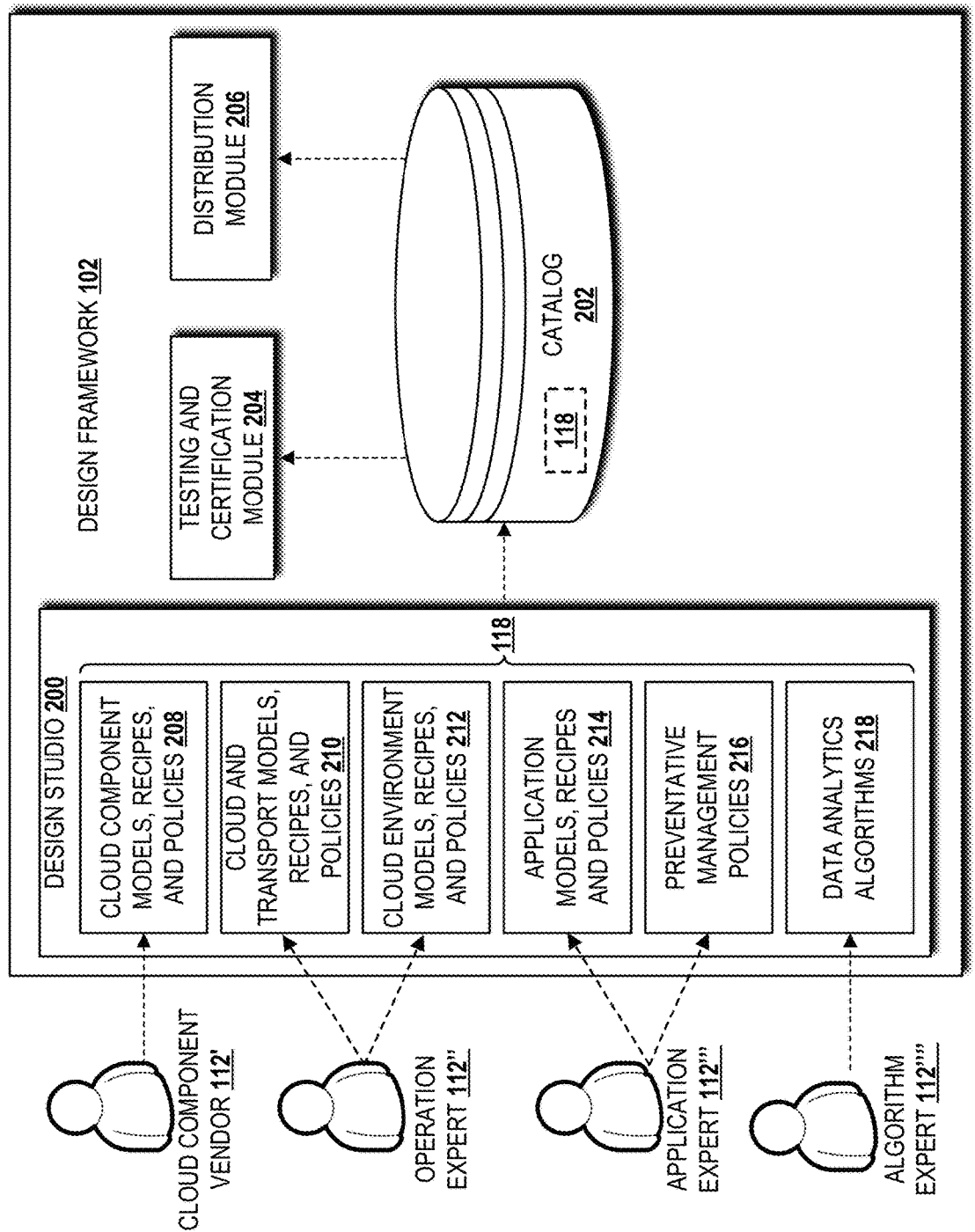
FIG. 2 is a block diagram illustrating aspects of a design framework, according to an illustrative embodiment.

Turning briefly to FIG. 2, a block diagram illustrating aspects of the design framework 102 will be described, according to an illustrative embodiment. The illustrated design framework 102 includes a design studio 200, a catalog 202, a testing and certification module 204, and a distribution module 206. The design studio 200 provides a user interface through which the users 112 can provide models, templates, recipes, and/or policy definitions for the cloud environment(s) 114, the cloud component(s) 115, network configurations, and the mission critical application(s) 116. These definitions can be stored in the catalog 202 collectively as meta-data 118 (shown in FIG. 1). In particular, the meta-data 118 can include: one or more cloud component models, recipes, and/or policies 208 created by one or more cloud component vendors 112'; one or more cloud and transport models, recipes, and/or policies 210 created by one or more operation experts 112"; one or more cloud environment models, recipes, and/or policies 212 created by one or more operation experts 112"; one or more application models, recipes, and/or policies 214 created by one or more application expert(s) 112''', one or more preventative maintenance policies 216 created by the application expert(s) 112''', and one or more data analytics algorithms 218 created by one or more algorithm experts 112''''.

The cloud component vendors 112' can include $1^{st}$ or $3^{rd}$ party vendors. The cloud component models can vary by components the provider uses. The cloud component recipes are dependent on provider's APIs to support life-cycle management and the ability to perform policy management in an internal ($1^{st}$ party) or $3^{rd}$ party environment. The cloud and transport models/recipes/policies 210 can vary depending on cloud provider (internal or $3^{rd}$ party). Additionally, the cloud and transport models/recipes/policies 210 can vary on the size of the cloud configuration, such as large (e.g., a data center), medium (e.g., a large central office), mini (e.g., a small central office and international), and access (e.g., remote location—cell site, etc.). The cloud and transport models/recipes/policies 210 can vary to a degree on cloud provider and the access to that cloud provider's cloud either directly or via an access provider. In general, larger/medium cloud configurations will have a greater number of transport options than mini/remote; and in general, larger/medium cloud configurations will have a more environment monitoring capabilities than mini/remote.

An example of a preventative maintenance policy for a critical application that uses compute resources that have an end of life expectancy of two years will now be described. The preventative maintenance policy could be that before the compute resources near their end-of life to either (1) re-locate the critical application to newer resources, (2) turn-down a non-critical application and use its resources, or (3) replace the existing resources with new resources. Another preventative maintenance policy would be to take action if the environmental temperature of a critical application exceeds a threshold either increase airflow around it or re-locate it before it may fail.

The algorithm experts 112'''' can include experts who look at trends to detect anomaly conditions and can make recommendations. For example, the algorithm experts 112'''' can be subject matter experts ("SMEs") and/or big data.

The testing and certification module 204 can perform one or more tests as part of a certification process that ensures the models, recipes, policies, and/or algorithms included in the meta-data 118 comply with certification requirements. An example is to establish a simulated network environment in which the design will be tested in an end-to-end process flow to verify it is producing the output as expected. After certification, the distribution module 206 can distribute for further use at least a portion of the meta-data 118 to the preventative framework 104, the execution framework 106, and/or the engineering framework 108 as best shown in FIG. 1. This procedure enforces consistency in deployments and eliminates redundant and possibly conflicting policy/rule development by different frameworks.

The operation experts 112" can use the design studio 200 to create the cloud and transport models, recipes, and policies 210, which are distributed via the distribution module 206 to the execution framework 106. This simplifies the adjustment of supported cloud configurations and cloud components. In addition, the operation experts 112" can create the cloud environment models, recipes, and policies 212, which are distributed via the distribution module 206 to the preventative framework 104 and the engineering framework 108.

The application experts 112''' can use the design studio 200 to create the application models, recipes, and policies 214, which are distributed via the distribution module 206 to the execution framework 106. The application policies can include policies regarding instantiation, data collection and analysis, homing (i.e., inter-datacenter), placement (i.e., intra-datacenter), and adjusting resource capacities. The application experts 112''' also can define preventative management policies 216, including policies regarding the critical band and maintenance window rules. The preventative management policies 216 are distributed via the distribution module 206 to the preventative framework 104.

The critical band can be a number that indicates how essential an application is to running the business or a specific aspect thereof. The various levels of the critical band are not defined, but roughly using (1) critical application that needs to be restored immediately since essential to achieving business initiatives or services, and (2) applications are non-critical and can be restored whenever (these can be preempted to support critical essential applications).

The maintenance window can be a timeframe from when the service provided by an application can be interrupted. For example, a service might have a weekday maintenance window of Monday-Saturday 1:00 am-5:00 am CT, and a weekend maintenance window of Saturday 11:00 pm CT-Sunday 7:00 am CT. Some services/applications might have significantly stricter requirements, whereas other services/applications might have no defined maintenance window and are instead exception based.

The algorithm experts 112"" can use the design studio 200 to create data analytics algorithms 218 for distribution via the distribution module 206 to the preventative framework 104. The data analytics algorithms 218 are designed for handling statistical analysis, event correlation, machine data analysis, and time series analysis, as well as diagnostic/predictive approaches such as correlation detection, and predictive approaches such as trend analysis. For example, predictive behavior to foresee future situations/events and take actions to avoid any potential issues, such as, for example, network growth projections, diversity, redundancy, fail-over measures, "predictable" man-made events such as sporting events, or seasonal natural disasters such as hurricanes.

Returning to FIG. 1, the preventative framework 104 receives the meta-data 118 from the design framework 102 and performs a predictive failure analysis 120 that monitors the health of the cloud component(s) 115 operating in the cloud environment(s) 114 to discover any component failures. The health of the cloud component(s) 115 can be measured using measurements, such as, for example, mean time between failure ("MTBF") measurement, component temperature and power consumption measurements, and performance degradation compared to "new" specifications. Other measurements known to those skilled in the art can be used to quantify the health of the cloud component(s) 115. The execution framework 106 then notifies the preventative framework 104 of any component failures (generally shown as "component failure discovery 124"). The predictive failure analysis 120 also receives, from the engineering framework 108, sensor data 126 for the cloud component(s) 115 of the cloud environment(s) 114. The sensor data 126 can be provided actively and/or passively in real-time. The sensor data 126 also can be provided in system logs (i.e., non-real-time). The sensor data 126 can include hardware sensor readings, environmental sensor readings, and/or utilization sensor readings. The predictive failure analysis 120 can use big data analytics and machine learning to detect abnormal patterns and the root causes thereof, and to predict the probability of where, when, and what cloud component failure(s) might occur. For example, a multi-dimensional problem space can be established, a set of variables and goals can be determined, machine learning algorithms (e.g. Random Forest) can be designed and implemented, and then historical temporal, spatial, and geographical data can be collected and feed streaming sensor data 126, along with design policies and rules to the machine learning module. The machine learning module can predict and detect abnormal patterns and their root causes. The machine learning module also can calculate the probability of where, when, and what component failure(s) might occur.

The preventative framework 104 also performs proactive operational adjustment 121 based upon output from the predictive failure analysis 120. The proactive operational adjustment 121 can include one or more adjustments and/or rescale of one or more compute, storage, and/or other resource (e.g., bandwidth resource) capacities available to one or more of the mission critical applications 116 operating within the cloud environment(s) 114. The proactive operational adjustment 121 alternatively or additionally can make one or more environmental changes to the physical environment(s) of the cloud environment(s) 114. For example, the proactive operational adjustment 121 can include an increase in fan speed or improvement to the cooling capabilities of at least a portion of the physical environment of the cloud environment(s) 114, such as a server facility, within which hardware (e.g., physical cloud components) is deployed that executes, at least in part, one or more of the mission critical applications 116. The proactive operational adjustment 121 also can include proactive replacement of any sub-components identified as risky (i.e., a high potential for failure) by the root cause analysis performed as part of the predictive failure analysis 120.

The proactive operational adjustment 121 can incorporate one or more mission critical factors in creating one or more policies and/or one or more engineering rules that govern initial homing and placement processes for the mission critical applications 116 within the cloud environment(s) 114. The policies and engineering rules can include, for example, requirements with regard to latency, scalability, geo-location, disaster recovery, security, or some combination thereof. The proactive operational adjustment 121 can fine tune the policies and engineering rules based upon the results of an analysis of component failure history and/or machine learning. The result of machine learning can be used to "fine tune" the parameters employed by the algorithms and analytics based upon comparing the prediction and actual failure events. The result of machine learning additionally or alternatively can be used to improve future calculations (i.e., reinforcement learning). The proactive operational adjustment 121 can determine an optimal and flexible maintenance schedule for the cloud component(s) 115 utilized by the mission critical application(s) 116 based, at least in part, upon output from the predictive failure analysis 120.

The preventative framework 104 also can perform preemptive mission critical application hardening 122. The preemptive mission critical application hardening 122 can include moving one or more of the mission critical applications 116 to healthy cloud components of the cloud components 115 operating within the same cloud environment or a different cloud environment. The preemptive mission critical application hardening 122 can include redeployment of one or more of the mission critical applications 116 during a maintenance window to ensure that the mission critical application(s) 116 are not impacted during peak usage hours. The preemptive mission critical application hardening 122 also can update one or more policies and/or one or more engineering rules based upon the results of mission critical application redeployment and/or machine learning.

Figure 3:
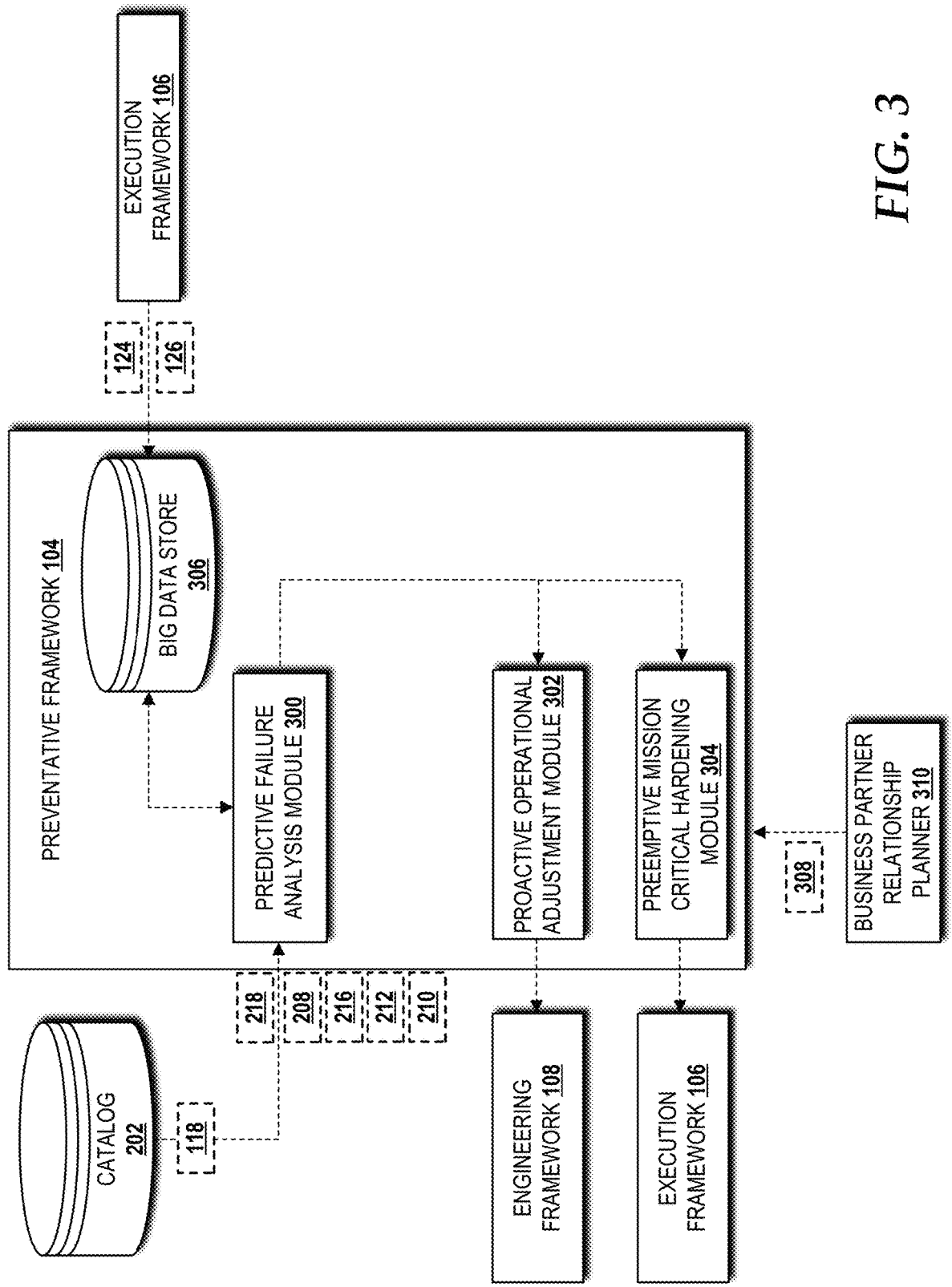
FIG. 3 is a block diagram illustrating aspects of a preventative framework, according to an illustrative embodiment.

Turning briefly to FIG. 3, a block diagram illustrating aspects of the preventative framework 104 will be described, according to an illustrative embodiment. The catalog 202 of the design framework 102 distributes the meta-data 118 to the preventative framework 104. The illustrated preventative framework 104 includes a predictive failure analysis module 300, a preemptive mission critical hardening module 304, and a proactive operational adjustment module 302 that perform the predictive failure analysis 120, the proactive operational adjustment 121, and the preemptive mission critical application hardening 122 (all best shown in FIG. 1), respectively.

The predictive failure analysis module 300 receives the data analytics algorithms 218 and the cloud component models, recipes, and policies 208 from the catalog 202 of the design framework 102. The predictive failure analysis module 300 also utilizes data collected from the execution framework 106 such as data associated with the component failure discovery 124, and data collected from the engineering framework 108 such as the sensor data 126. The component failure discovery 124 data and the sensor data 126 can be stored in a big data store 306 of the preventative framework 104. The predictive failure analysis module 300 can use structured and unstructured data stored in the big data store 306 to perform pattern recognition and analysis on failure history and to search for valid correlation between component failure and all potential contributing factors to the component failure. In some embodiments, the predictive failure analysis module 300 can provide a visualization element whereby correlations can be validated by one or more analytics experts. Results from the predicative failure analysis module 300 drives operations of the proactive operational adjustment module 302 and the preemptive mission critical hardening module 304.

The proactive operational adjustment module 302 uses the results from the predictive failure analysis 120 performed by the predictive failure analysis module 300 to perform one or more operational adjustments. The operational adjustment can include, for example, an adjustment/rescale of compute, storage, and/or other (e.g., bandwidth) resource capacities for the mission critical applications 116, one or more specific environmental changes such as to increase cooling to reduce the risk of failures, and/or to replace one or more risky cloud components identified by root cause analysis. The proactive operational adjustment module 302 can determine an optimal replacement time for one or more of the cloud components 115 that are predicted to fail and to generate one or more recommendations to optimize the cloud component life cycle. The proactive operational adjustment module 302 also provides procurement recommendations by combining the specific vendor model failure rate with vendor information 308 received from an external business partner relationship planner 310 in consideration of factors such as, for example, balance of trade, percentage of vendor business, general standing, and terms and conditions. Information is also available to recommend individual site environmental modifications to improve longevity of cloud component life. Recommendations made by the proactive operational adjustment module 302 are passed to the engineering framework 108 for approval and action.

The preemptive mission critical hardening module 304 receives output from the proactive operational adjustment module 302 to adjust and/or rescale application resources capacity to ensure that the mission critical application(s) 116 are best suited to perform at expected levels. Results of the preemptive mission critical hardening module 304 can be used to instruct the execution framework 106 move one or more of the mission critical applications 116 to one or more healthier cloud components, or if necessary, to a healthier cloud environment. The preemptive mission critical hardening module 304 also provides the execution framework 106 access to the cloud components 115 that are healthy to add new applications and/or services.

Figure 4:
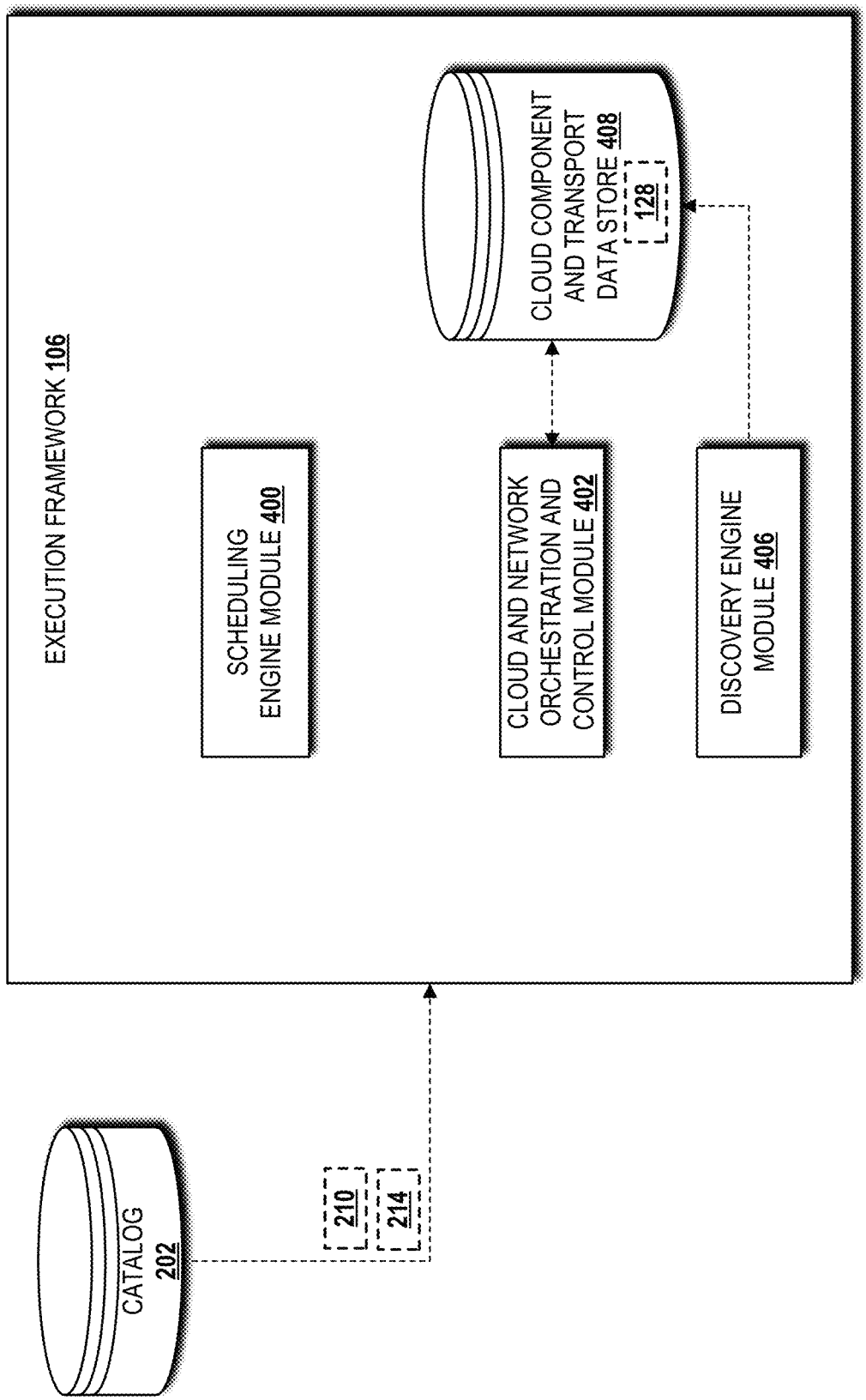
FIG. 4 is a block diagram illustrating aspects of an execution framework, according to an illustrative embodiment.

Turning briefly to FIG. 4, the illustrated execution framework 106 includes a scheduling engine module 400, a cloud and network orchestration and control module 402, a discovery engine module 406, and a cloud component and transport data store 408. The execution framework 106 also has access to the catalog 202 from the design framework 102. The preventative framework 104 triggers the scheduling engine module 400 to adjust/rescale application resource capacities and/or to move applications to healthier component(s) and/or environment(s). To perform these functions, the scheduling engine module 400 uses applications policies 214 regarding the critical band and maintenance window obtained from the catalog 202 of the design framework 102. At the appropriate time, the execution framework 106 triggers the cloud and network orchestration and control module 402 to perform the required operations using the cloud and transport models, recipes, and policies 210 and the application models, recipes, and policies 214 from the catalog 202 defined in the design framework 102.

The execution framework 106 also receives, from the preventative framework 104, a listing or other notification of which healthy cloud components to use. The engineering framework 108 provides the execution framework 106 with planned resource and configuration data 128 as best shown in FIG. 1. The planned resource and configuration data 128 can be stored in the cloud component and transport data store 408 for network/service delivery, moving the critical applications to healthier components and/or environment, and service assurance closed loop control.

The discovery engine module 406 updates the cloud component and transport data store 408 of any component discovery and component failures. The preventative framework 104 can subscribe to component discovery and component failure data to perform the predictive failure analysis 120.

Figure 5:
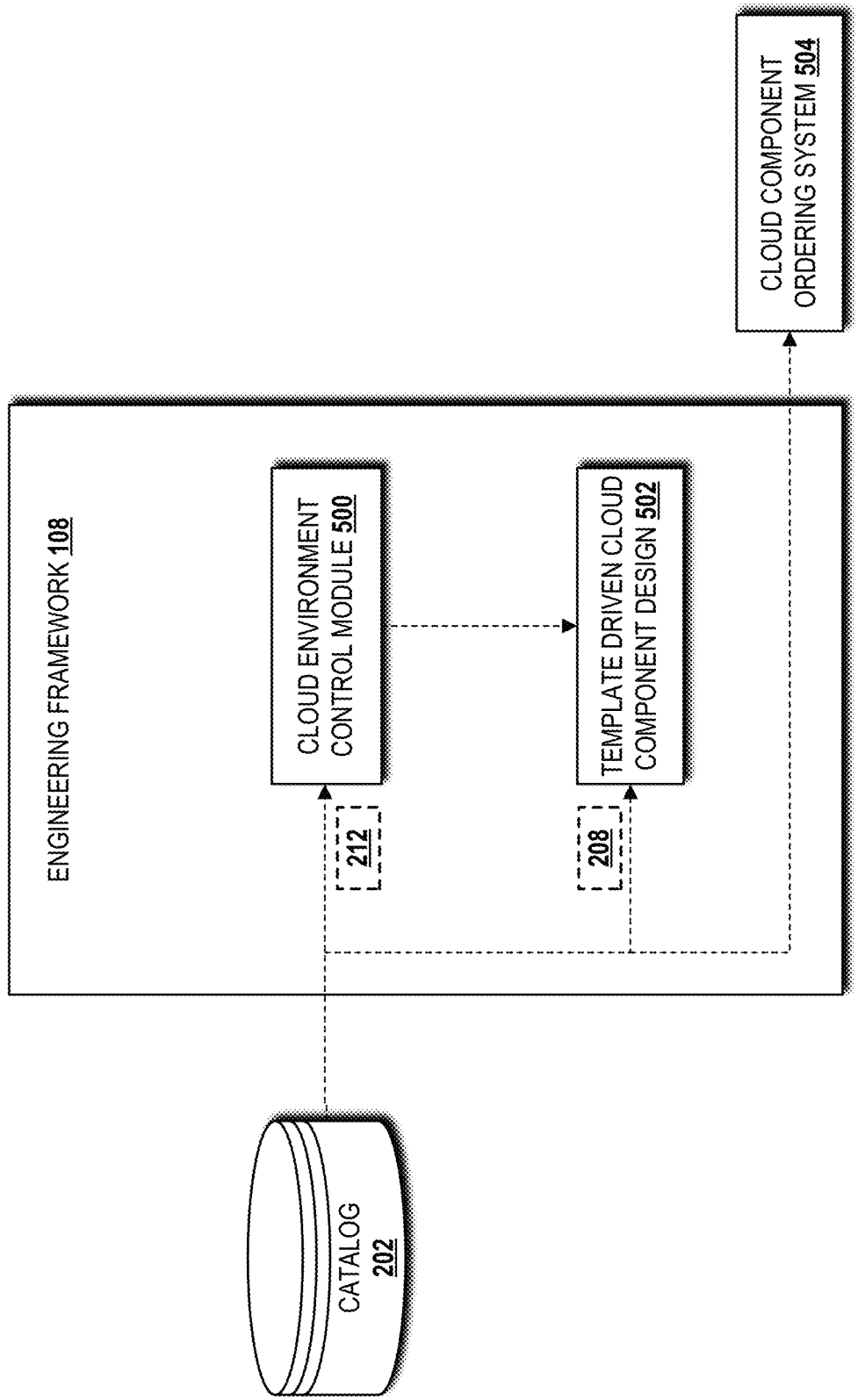
FIG. 5 is a block diagram illustrating aspects of an engineering framework, according to an illustrative embodiment.

Turning now to FIG. 5, the illustrated engineering framework 108 includes the catalog 202 provided by the design framework 102, a cloud environment control module 500, and a template driven cloud component design module 502. The catalog 202 provides the cloud environment models, recipes, and models 212 to the cloud environment control module 500. The catalog 202 also provides cloud component models, recipes, and policies 208 to the template driven cloud component design module 502. The cloud environment control module 500 monitors the cloud hardware environment and provides data, such as the sensor data 126 to the preventative framework 104 for performance of the predictive failure analysis 120. Based upon pattern analysis, the preventative framework 104 can recommend environmental changes back to the cloud environment control module 500. When possible, the cloud environment control module 500 can trigger one or more environmental changes, and if necessary, the cloud environment control module 500 can trigger manual environmental adjustments.

The preventative framework 104 also drives the template driven cloud component design module 502 by triggering cloud component replacement and recommendations regarding cloud component procurement. For cloud component replacement, the template driven cloud component design module 502 interacts with an external cloud component ordering system 504 that orders the equipment and any necessary installation services 146 (best shown in FIG. 1). The engineering framework 108 then notifies the execution framework 106 of the planned resources and configurations 128.

Figure 6:
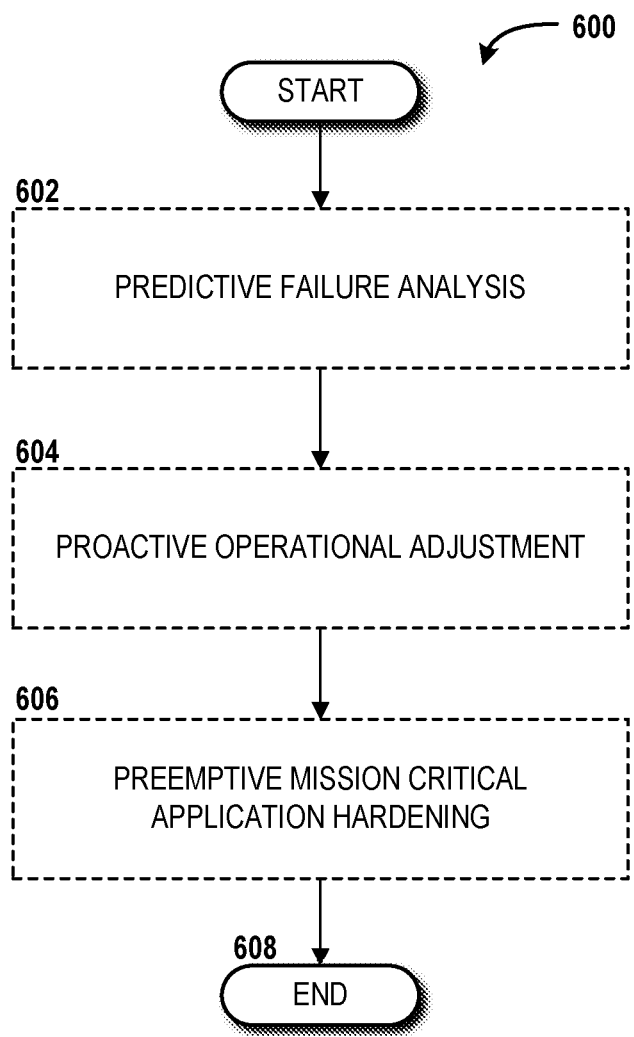
FIG. 6 is a flow diagram illustrating aspects of a method for intelligent preventative maintenance of critical applications in a cloud environment, according to an illustrative embodiment.

Turning now to FIG. 6, aspects of a method 600 for the intelligent preventative maintenance of the mission critical application(s) 116 in the cloud environment(s) 114 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of one or more cloud environments, computing systems, devices, engines, or components disclosed herein to perform operations. It should be understood that the performance of one or more operations may include operations executed by one or more virtual processors at the instructions of one or more of the aforementioned hardware processors.

The method 600 will be described with reference to FIG. 6 and additional reference to FIGS. 1 and 3. The illustrated method 600 begins and proceeds to operation 602, where the preventative framework 104 performs the predictive failure analysis 120 via execution of the predictive failure analysis module 300. The predictive failure analysis 120 monitors the health of one or more of the cloud components 115 operating in the cloud environment(s) 114, including physical and virtual components thereof (best shown in FIG. 10), that host one or more of the mission critical applications 116. The predictive failure analysis 120 collects, correlates, and accumulates an array of sensor readings (collectively, "sensor data 126" in FIG. 1) for the cloud components 115 and utilizes big data analytics and machine learning to detect abnormal patterns and the root cause(s) thereof. The predictive failure analysis can predict the probability of where, when, and what component(s) failure(s) might occur. A method 700 for predictive failure analysis as part of the method 600 for intelligent preventative maintenance of the mission critical applications 116 will be described below with reference to FIG. 7.

From operation 602, the method 600 proceeds to operation 604, where the preventative framework 104 performs the proactive operational adjustment 121 via execution of the proactive operational adjustment module 302. The proactive operational adjustment 121 can perform one or more operational adjustments based upon the predictive failure analysis 120 performed at operation 602. Some examples of operational adjustments include rescaling compute, storage, and/or bandwidth resource capacities for the mission critical applications 116, making environmental changes such as increasing cooling to reduce risk of failure due to heat, and replacing risky sub-components identified by the root cause identified during the predictive failure analysis 120 performed at operation 602. In addition, the operation 604 can incorporate one or more mission critical factors in creating policies and/or engineering rules that govern the initial mission critical application homing and placement processes. The mission critical factors can include, for example, requirements on latency, scalability, geo-location, disaster recovery, security, and the like. The operation 604 also can fine tune the policies and engineering rules based upon the results of component failure history analysis and/or machine learning. The operation 604 can determine the optimal and flexible maintenance schedule for the cloud components 115 based upon the predictive failure analysis 120 performed at operation 602. A method 800 for proactive operational adjustment as part of the method 600 for intelligent preventative maintenance of the mission critical applications 116 will be described below with reference to FIG. 8.

From operation 604, the method 600 proceeds to operation 606, where the preventative framework 104 performs the preemptive mission critical application hardening 122 via execution of the preemptive mission critical hardening module 304. The preemptive mission critical application hardening 122 can include moving one or more of the mission critical applications 116 to one or more healthier cloud components 115 and/or cloud environments, performing application redeployment during a maintenance window to ensure that the mission crucial applications 116 are not impacted during peak usage hours, and updating the policies and/or engineering rules based upon the results of application redeployment and/or machine learning. A method 900 for preemptive mission critical application hardening as part of the method 600 for intelligent preventative maintenance of the mission critical applications 116 will be described below with reference to FIG. 9. From operation 606, the method 600 proceeds to operation 608, where the method 600 ends.

Figure 7:
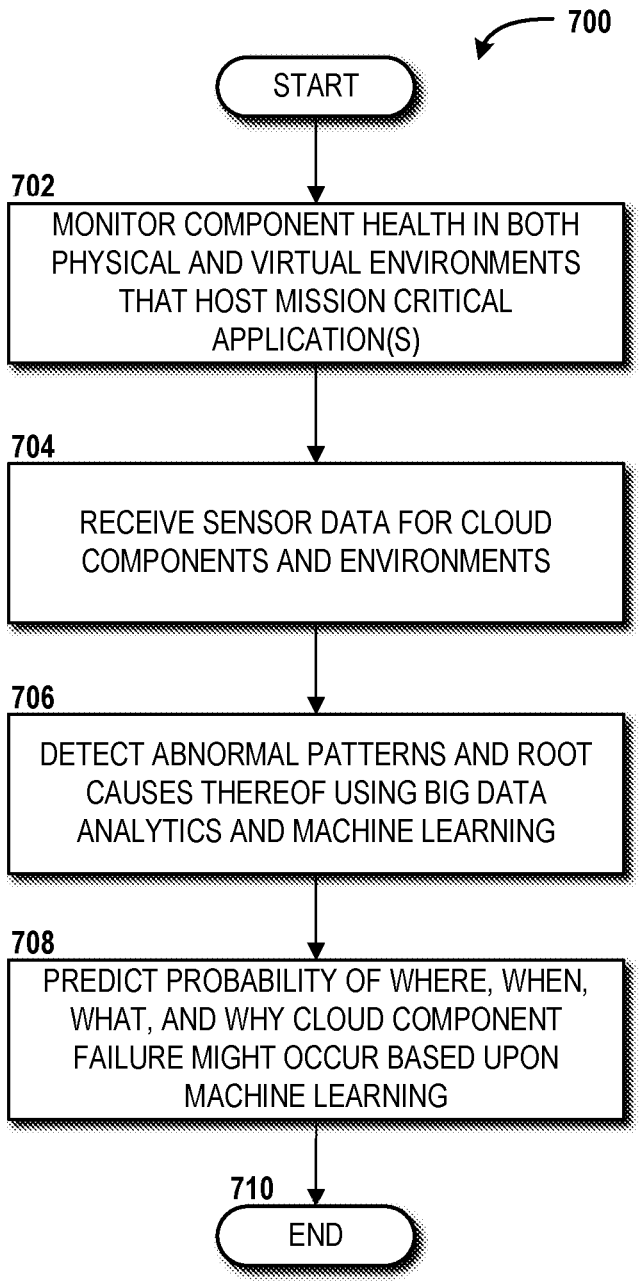
FIG. 7 is a flow diagram illustrating aspects of a method for predictive failure analysis as part of the method for intelligent preventative maintenance of critical applications in a cloud environment, according to an illustrative embodiment.

Turning now to FIG. 7, aspects of a method 700 for predictive failure analysis as part of the method 600 for intelligent preventative maintenance of the mission critical applications 116 will be described, according to an illustrative embodiment. The method 700 will be described with reference to FIG. 7 and additional reference to FIGS. 1 and 3 from the perspective of the preventative framework 104 executing the predictive failure analysis module 300.

The method 700 begins and proceeds to operation 702, where the preventative framework 104 monitors the health of one or more of the cloud components 115 in both the physical and virtual environment of the cloud environment(s) 114 that host one or more of the mission critical applications 116. From operation 702, the method 700 proceeds to operation 704, where the preventative framework 104 collects, correlates, and accumulates the sensor data 126 from the engineering framework 108. From operation 704, the method 700 proceeds to operation 706, where the preventative framework 104 detects one or more abnormal patterns in the sensor data 126 and the root causes thereof using big data analytics and machine learning. From operation 706, the method 700 proceeds to operation 708, where the preventative framework 104 predicts the probability of where, when, what, and why cloud component failure might occur based upon machine learning. From operation 708, the method 700 proceeds to operation 710, where the method 700 ends.

Figure 8:
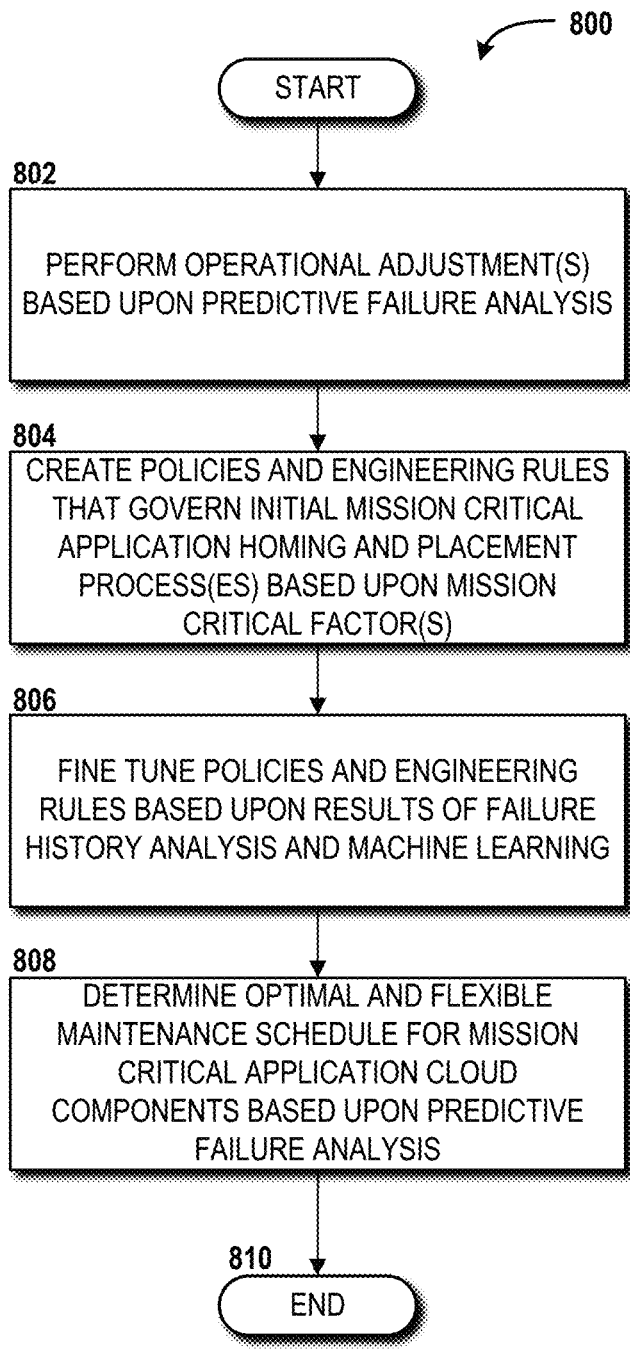
FIG. 8 is a flow diagram illustrating aspects of a method for proactive operational adjustment as part of the method for intelligent preventative maintenance of critical applications in a cloud environment, according to an illustrative embodiment.

Turning now to FIG. 8, aspects of a method 800 for proactive operational adjustment as part of the method 600 for intelligent preventative maintenance of the mission critical applications 116 in will be described, according to an illustrative embodiment. The method 800 will be described with reference to FIG. 8 and additional reference to FIGS. 1 and 3 from the perspective of the preventative framework 104 executing the proactive operational adjustment module 302.

The method 800 begins and proceeds to operation 802, where the preventative framework 104 performs one or more operational adjustments based upon the predictive failure analysis 120. From operation 802, the method 800 proceeds to operation 804, where the preventative framework 104 creates one or more policies and/or one or more engineering rules that govern initial homing and placement processes for the mission critical applications 116 based upon one or more mission critical factors. From operation 804, the method 800 proceeds to operation 806, where the preventative framework 104 fine tunes the policies and/or engineering rules based upon results of a failure history analysis and machine learning. From operation 806, the method 800 proceeds to operation 808, where the preventative framework 104 determines, based upon the predictive failure analysis 120, an optimal and flexible maintenance schedule for the cloud component(s) 115 upon which the mission critical applications 116 are executed. From operation 808, the method 800 proceeds to operation 810, where the method 800 ends.

Figure 9:
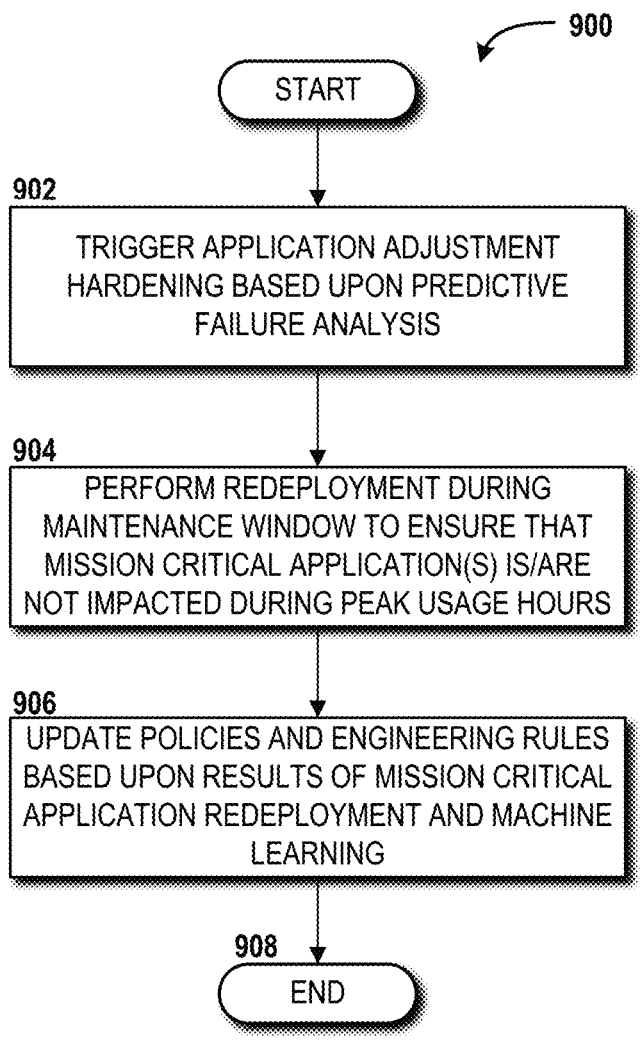
FIG. 9 is a flow diagram illustrating aspects of a method for preemptive mission critical application hardening as part of the method for intelligent preventative maintenance of critical applications in a cloud environment, according to an illustrative embodiment.

Turning now to FIG. 9, aspects of a method 900 for preemptive mission critical application hardening as part of the method 600 for intelligent preventative maintenance of the mission critical applications 116 will be described, according to an illustrative embodiment. The method 900 will be described with reference to FIG. 9 and additional reference to FIGS. 1 and 3 from the perspective of the preventative framework 104 executing the preemptive mission critical application hardening module 304.

The method 900 begins and proceeds to operation 902, where the preventative framework 104 triggers application adjustment hardening based upon the predictive failure analysis 120. From operation 902, the method 900 proceeds to operation 904, where the preventative framework 104 performs redeployment during a maintenance window to ensure that the mission critical applications 116 are not impacted during peak usage hours. From operation 904, the method 900 proceeds to operation 906, where the preventative framework 104 updates the policies and/or engineering rules based upon results of mission critical application redeployment and machine learning. From operation 906, the method 900 proceeds to operation 908, where the method 900 ends.

Figure 10:
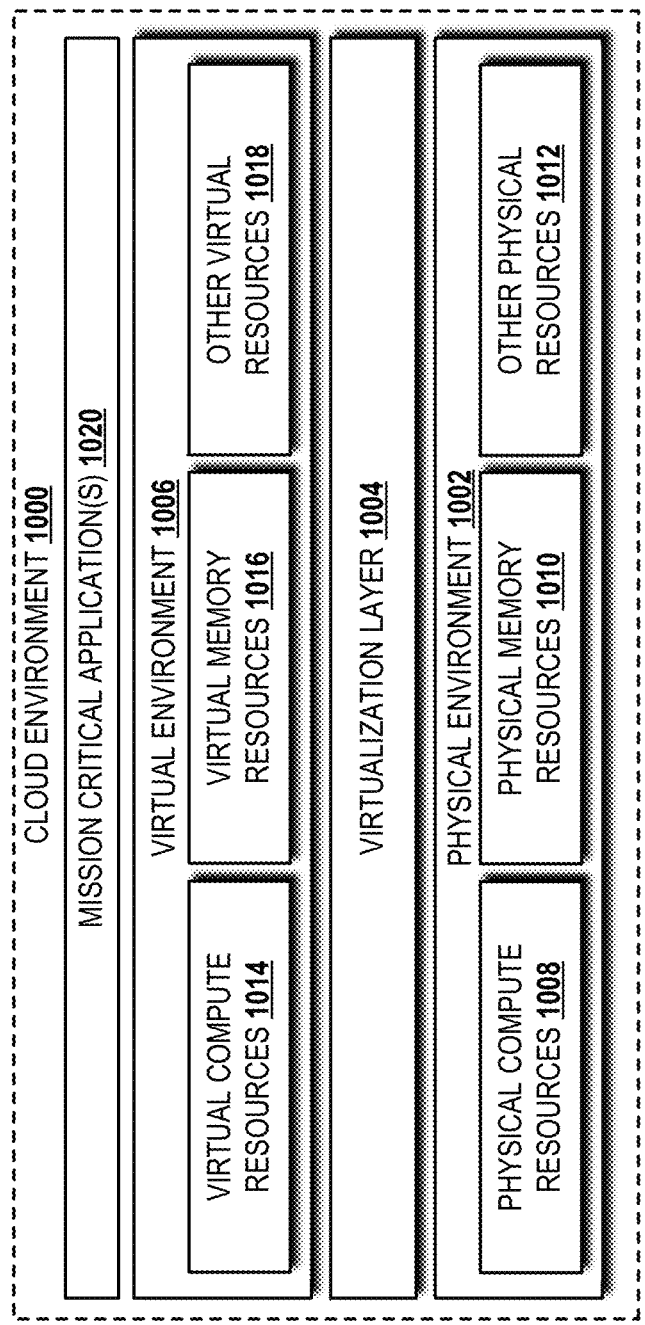
FIG. 10 is a block diagram illustrating aspects of an illustrative cloud environment capable of implementing aspects of the embodiments presented herein.

Turning now to FIG. 10, an illustrative cloud environment 1000 will be described, according to an embodiment. In some embodiments, the cloud environment(s) 114 introduced above with reference to FIG. 1 can be configured the same as or similar to the cloud environment 1000. The cloud environment 1000 includes a physical environment 1002, a virtualization layer 1004, and a virtual environment 1006. While no connections are shown in FIG. 10, it should be understood that some, none, or all of the components illustrated in FIG. 10 can be configured to interact with one other to carry out various functions described herein. In some embodiments, the components are arranged so as to communicate via one or more networks, such as the network(s) 117 (best shown in FIG. 1). Thus, it should be understood that FIG. 10 and the remaining description are intended to provide a general understanding of a suitable environment in which various aspects of the embodiments described herein can be implemented, and should not be construed as being limiting in any way.

The physical environment 1002 provides hardware resources, which, in the illustrated embodiment, include one or more physical compute resources 1008, one or more physical memory resources 1010, and one or more other physical resources 1012. The physical compute resource(s) 1008 can include one or more hardware components that perform computations to process data and/or to execute computer-executable instructions of one or more application programs (e.g., the mission critical applications 116), one or more operating systems, and/or other software. The physical compute resources 1008 can include one or more central processing units ("CPUs") configured with one or more processing cores. The physical compute resources 1008 can include one or more graphics processing unit ("GPU") configured to accelerate operations performed by one or more CPUs, and/or to perform computations to process data, and/or to execute computer-executable instructions of one or more application programs (e.g., the mission critical applications 116), one or more operating systems, and/or other software that may or may not include instructions particular to graphics computations. In some embodiments, the physical compute resources 1008 can include one or more discrete GPUs. In some other embodiments, the physical compute resources 1008 can include CPU and GPU components that are configured in accordance with a co-processing CPU/GPU computing model, wherein the sequential part of an application executes on the CPU and the computationally-intensive part is accelerated by the GPU processing capabilities. The physical compute resources 1008 can include one or more system-on-chip ("SoC") components along with one or more other components, including, for example, one or more of the physical memory resources 1010, and/or one or more of the other physical resources 1012. In some embodiments, the physical compute resources 1008 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The physical compute resources 1008 can be or can include one or more hardware components architected in accordance with an ARM architecture, available for license from ARM HOLDINGS of Cambridge, United Kingdom. Alternatively, the physical compute resources 1008 can be or can include one or more hardware components architected in accordance with an x86 architecture, such an architecture available from INTEL CORPORATION of Mountain View, Calif., and others. Those skilled in the art will appreciate the implementation of the physical compute resources 1008 can utilize various computation architectures, and as such, the physical compute resources 1008 should not be construed as being limited to any particular computation architecture or combination of computation architectures, including those explicitly disclosed herein.

The physical memory resource(s) 1010 can include one or more hardware components that perform storage/memory operations, including temporary or permanent storage operations. In some embodiments, the physical memory resource(s) 1010 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 1008.

The other physical resource(s) 1012 can include any other hardware resources that can be utilized by the physical compute resources(s) 1008 and/or the physical memory resource(s) 1010 to perform operations described herein. The other physical resource(s) 1012 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 1002 can be virtualized by one or more virtual machine monitors (not shown; also known as "hypervisors") operating within the virtualization/control layer 1004 to create virtual resources that reside in the virtual environment 1006. The virtual machine monitors can be or can include software, firmware, and/or hardware that alone or in combination with other software, firmware, and/or hardware, creates and manages virtual resources operating within the virtual environment 1006.

The virtual resources operating within the virtual environment 1006 can include abstractions of at least a portion of the physical compute resources 1008, the physical memory resources 1010, and/or the other physical resources 1012, or any combination thereof. In some embodiments, the abstractions can include one or more virtual machines upon which one or more applications, such as the mission critical applications 116, can be executed.

Figure 11:
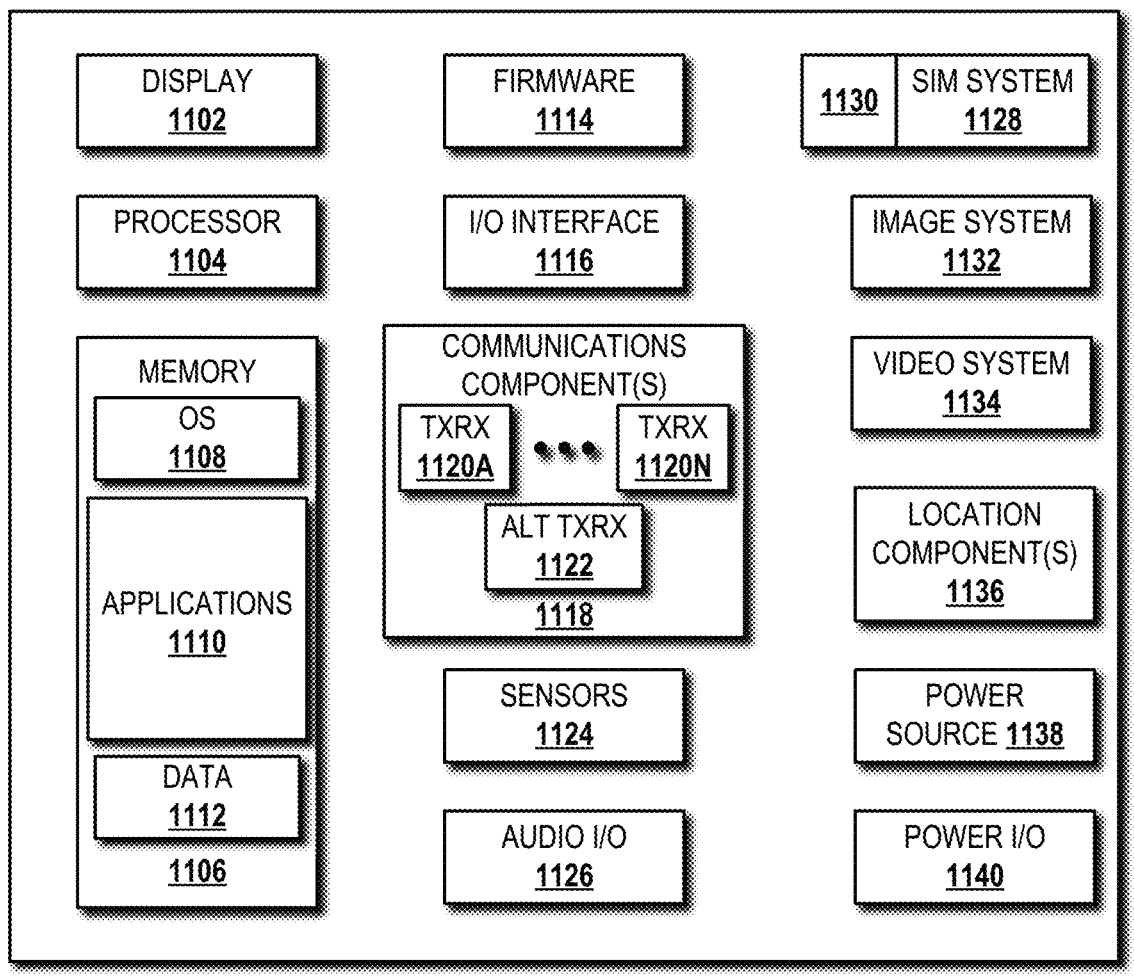
FIG. 11 is a block diagram illustrating an example mobile device capable of implementing aspects of the embodiments disclosed herein.

Turning now to FIG. 11, an illustrative mobile device 1100 and components thereof will be described. While connections are not shown between the various components illustrated in FIG. 11, it should be understood that some, none, or all of the components illustrated in FIG. 11 can be configured to interact with one other to carry out various device functions. In some embodiments, the components are arranged so as to communicate via one or more busses (not shown). Thus, it should be understood that FIG. 11 and the following description are intended to provide a general understanding of a suitable environment in which various aspects of embodiments can be implemented, and should not be construed as being limiting in any way.

As illustrated in FIG. 11, the mobile device 1100 can include a display 1102 for displaying data. According to various embodiments, the display 1102 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 1100 also can include a processor 1104 and a memory or other data storage device ("memory") 1106. The processor 1104 can be configured to process data and/or can execute computer-executable instructions stored in the memory 1106. The computer-executable instructions executed by the processor 1104 can include, for example, an operating system 1108, one or more applications 1110, other computer-executable instructions stored in a memory 1106, or the like. In some embodiments, the applications 1110 also can include a user interface ("UP") application (not illustrated in FIG. 11).

The UI application can interface with the operating system 1108 to facilitate user interaction with functionality and/or data stored at the mobile device 1100 and/or stored elsewhere. In some embodiments, the operating system 1108 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1104 to aid a user in entering content, viewing account information, answering/initiating calls, entering/deleting data, entering and setting user IDs and passwords for device access, configuring settings, manipulating address book content and/or settings, multimode interaction, interacting with other applications 1110, and otherwise facilitating user interaction with the operating system 1108, the applications 1110, and/or other types or instances of data 1112 that can be stored at the mobile device 1100. The data 1112 can include, for example, one or more identifiers, and/or other applications or program modules. According to various embodiments, the data 1112 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 1110, the data 1112, and/or portions thereof can be stored in the memory 1106 and/or in a firmware 1114, and can be executed by the processor 1104. The firmware 1114 also can store code for execution during device power up and power down operations. It can be appreciated that the firmware 1114 can be stored in a volatile or non-volatile data storage device including, but not limited to, the memory 1106 and/or a portion thereof.

The mobile device 1100 also can include an input/output ("I/O") interface 1116. The I/O interface 1116 can be configured to support the input/output of data such as location information, user information, organization information, presence status information, user IDs, passwords, and application initiation (start-up) requests. In some embodiments, the I/O interface 1116 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RHO port, a proprietary port, combinations thereof, or the like. In some embodiments, the mobile device 1100 can be configured to synchronize with another device to transfer content to and/or from the mobile device 1100. In some embodiments, the mobile device 1100 can be configured to receive updates to one or more of the applications 1110 via the I/O interface 1116, though this is not necessarily the case. In some embodiments, the I/O interface 1116 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1116 may be used for communications between the mobile device 1100 and a network device or local device.

The mobile device 1100 also can include a communications component 1118. The communications component 1118 can be configured to interface with the processor 1104 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 1118 includes a multimode communications subsystem for facilitating communications via the cellular network and one or more other networks.

The communications component 1118, in some embodiments, includes one or more transceivers. The one or more transceivers, if included, can be configured to communicate over the same and/or different wireless technology standards with respect to one another. For example, in some embodiments one or more of the transceivers of the communications component 1118 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, and greater generation technology standards. Moreover, the communications component 1118 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 1118 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 1118 can include a first transceiver ("TxRx") 1120A that can operate in a first communications mode (e.g., GSM). The communications component 1118 also can include an $N^{th}$ transceiver ("TxRx") 1120N that can operate in a second communications mode relative to the first transceiver 1120A (e.g., UMTS). While two transceivers 1120A-1120N (hereinafter collectively and/or generically referred to as "transceivers 1120") are shown in FIG. 11, it should be appreciated that less than two, two, and/or more than two transceivers 1120 can be included in the communications component 1118.

The communications component 1118 also can include an alternative transceiver ("Alt TxRx") 1122 for supporting other types and/or standards of communications. According to various contemplated embodiments, the alternative transceiver 1122 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 1118 also can facilitate reception from terrestrial radio networks, digital satellite radio networks, internet-based radio service networks, combinations thereof, and the like. The communications component 1118 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1100 also can include one or more sensors 1124. The sensors 1124 can include temperature sensors, light sensors, air quality sensors, movement sensors, orientation sensors, noise sensors, proximity sensors, or the like. As such, it should be understood that the sensors 1124 can include, but are not limited to, accelerometers, magnetometers, gyroscopes, infrared sensors, noise sensors, microphones, combinations thereof, or the like. Additionally, audio capabilities for the mobile device 1100 may be provided by an audio I/O component 1126. The audio I/O component 1126 of the mobile device 1100 can include one or more speakers for the output of audio signals, one or more microphones for the collection and/or input of audio signals, and/or other audio input and/or output devices.

The illustrated mobile device 1100 also can include a subscriber identity module ("SIM") system 1128. The SIM system 1128 can include a universal SIM ("USIM"), a universal integrated circuit card ("UICC") and/or other identity devices. The SIM system 1128 can include and/or can be connected to or inserted into an interface such as a slot interface 1130. In some embodiments, the slot interface 1130 can be configured to accept insertion of other identity cards or modules for accessing various types of networks. Additionally, or alternatively, the slot interface 1130 can be configured to accept multiple subscriber identity cards. Because other devices and/or modules for identifying users and/or the mobile device 1100 are contemplated, it should be understood that these embodiments are illustrative, and should not be construed as being limiting in any way.

The mobile device 1100 also can include an image capture and processing system 1132 ("image system"). The image system 1132 can be configured to capture or otherwise obtain photos, videos, and/or other visual information. As such, the image system 1132 can include cameras, lenses, charge-coupled devices ("CCDs"), combinations thereof, or the like. The mobile device 1100 may also include a video system 1134. The video system 1134 can be configured to capture, process, record, modify, and/or store video content. Photos and videos obtained using the image system 1132 and the video system 1134, respectively, may be added as message content to an MMS message, email message, and sent to another mobile device. The video and/or photo content also can be shared with other devices via various types of data transfers via wired and/or wireless communication devices as described herein.

The mobile device 1100 also can include one or more location components 1136. The location components 1136 can be configured to send and/or receive signals to determine a geographic location of the mobile device 1100. According to various embodiments, the location components 1136 can send and/or receive signals from global positioning system ("GPS") devices, assisted GPS ("A-GPS") devices, WI-FI/WIMAX and/or cellular network triangulation data, combinations thereof, and the like. The location component 1136 also can be configured to communicate with the communications component 1118 to retrieve triangulation data for determining a location of the mobile device 1100. In some embodiments, the location component 1136 can interface with cellular network nodes, telephone lines, satellites, location transmitters and/or beacons, wireless network transmitters and receivers, combinations thereof, and the like. In some embodiments, the location component 1136 can include and/or can communicate with one or more of the sensors 1124 such as a compass, an accelerometer, and/or a gyroscope to determine the orientation of the mobile device 1100. Using the location component 1136, the mobile device 1100 can generate and/or receive data to identify its geographic location, or to transmit data used by other devices to determine the location of the mobile device 1100. The location component 1136 may include multiple components for determining the location and/or orientation of the mobile device 1100.

The illustrated mobile device 1100 also can include a power source 1138. The power source 1138 can include one or more batteries, power supplies, power cells, and/or other power subsystems including alternating current ("AC") and/or direct current ("DC") power devices. The power source 1138 also can interface with an external power system or charging equipment via a power I/O component 1140. Because the mobile device 1100 can include additional and/or alternative components, the above embodiment should be understood as being illustrative of one possible operating environment for various embodiments of the concepts and technologies described herein. The described embodiment of the mobile device 1100 is illustrative, and should not be construed as being limiting in any way.

Figure 12:
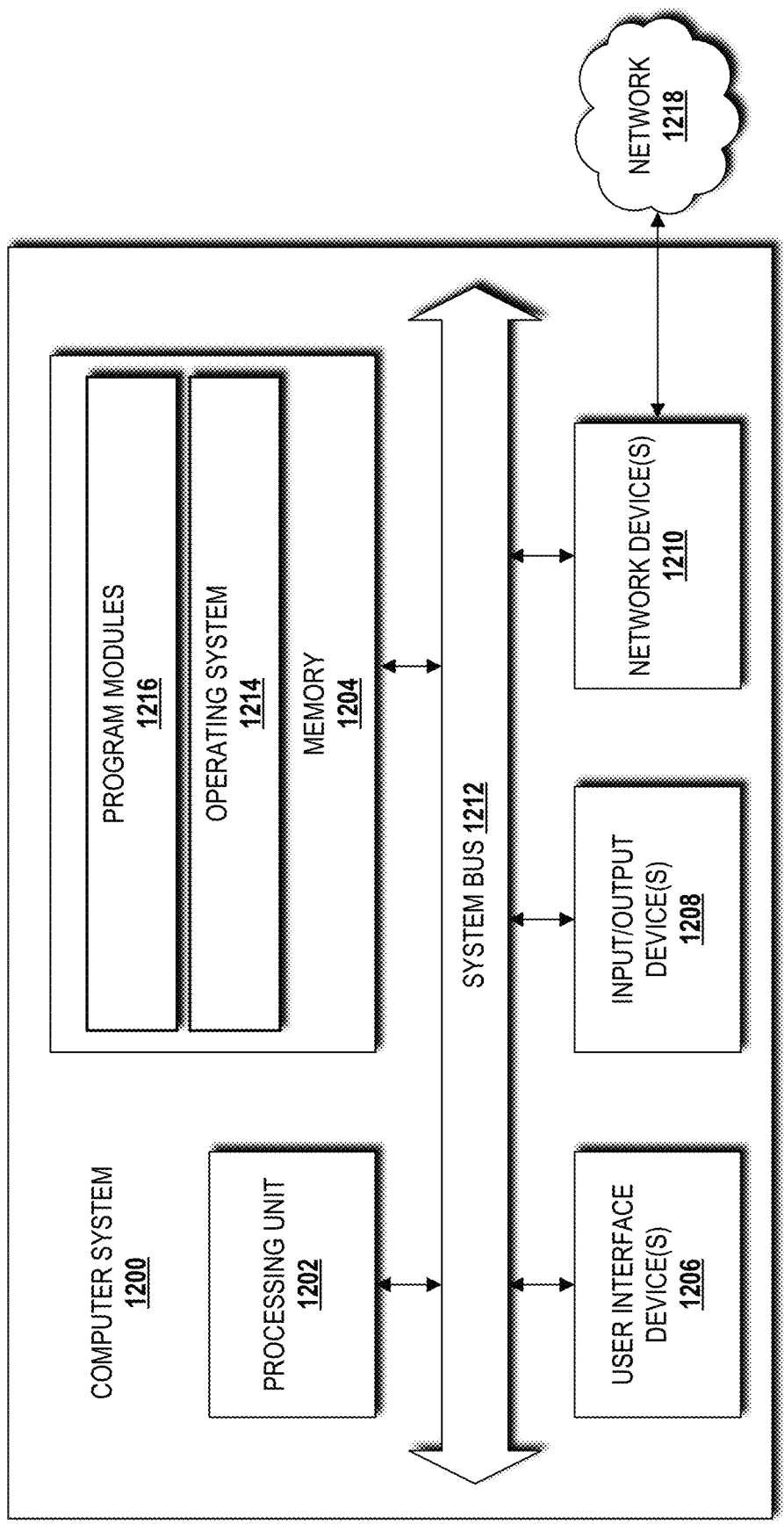
FIG. 12 is a block diagram illustrating an example computer system capable of implementing aspects of the embodiments presented herein.

FIG. 12 is a block diagram illustrating a computer system 1200 configured to provide the functionality in accordance with various embodiments of the concepts and technologies disclosed herein. In some implementations, the physical environment 1002 (illustrated in FIG. 10) includes one or more computers that are configured like the architecture of the computer system 1200. The computer system 1200 may provide at least a portion of the physical compute resources 1008, the physical memory resources 1010, and/or the other physical resources 1012. It should be understood, however, that modification to the architecture may be made to facilitate certain interactions among elements described herein.

The computer system 1200 includes a processing unit 1202, a memory 1204, one or more user interface devices 1206, one or more input/output ("I/O") devices 1208, and one or more network devices 1210, each of which is operatively connected to a system bus 1212. The bus 1212 enables bi-directional communication between the processing unit 1202, the memory 1204, the user interface devices 1206, the I/O devices 1208, and the network devices 1210.

The processing unit 1202 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The physical compute resources 1008 (illustrated in FIG. 10) can include one or more processing units 1202.

The memory 1204 communicates with the processing unit 1202 via the system bus 1212. In some embodiments, the memory 1204 is operatively connected to a memory controller (not shown) that enables communication with the processing unit 1202 via the system bus 1212. The physical memory resources 1010 (illustrated in FIG. 10) can include one or more instances of the memory 1204. The illustrated memory 1204 contains an operating system 1214 and one or more program modules 1216. The operating system 1214 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 1216 may include various software and/or program modules to perform the various operations described herein. The program modules 1216 and/or other programs can be embodied in computer-readable media containing instructions that, when executed by the processing unit 1202, perform various operations such as those described herein. According to embodiments, the program modules 1216 may be embodied in hardware, software, firmware, or any combination thereof.

By way of example, and not limitation, computer-readable media may include any available computer storage media or communication media that can be accessed by the computer system 1200. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1200. In the claims, the phrase "computer storage medium" and variations thereof does not include waves or signals per se and/or communication media.

The user interface devices 1206 may include one or more devices with which a user accesses the computer system 1200. The user interface devices 1206 may include, but are not limited to, computers, servers, PDAs, cellular phones, or any suitable computing devices. The I/O devices 1208 enable a user to interface with the program modules 1216. In one embodiment, the I/O devices 1208 are operatively connected to an I/O controller (not shown) that enables communication with the processing unit 1202 via the system bus 1212. The I/O devices 1208 may include one or more input devices, such as, but not limited to, a keyboard, a mouse, or an electronic stylus. Further, the I/O devices 1208 may include one or more output devices, such as, but not limited to, a display screen or a printer. In some embodiments, the I/O devices 1208 can be used for manual controls for operations to exercise under certain emergency situations.

The network devices 1210 enable the computer system 1200 to communicate with other networks or remote systems via a network 1218. Examples of the network devices 1210 include, but are not limited to, a modem, a radio frequency ("RF") or infrared ("IR") transceiver, a telephonic interface, a bridge, a router, or a network card. The network 1218 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 1218 may be a wired network such as, but not limited to, a Wide Area Network ("WAN"), a wired Personal Area Network ("PAN"), or a wired Metropolitan Area Network ("MAN"). The network 1214 may be any other network described herein.

Figure 13:
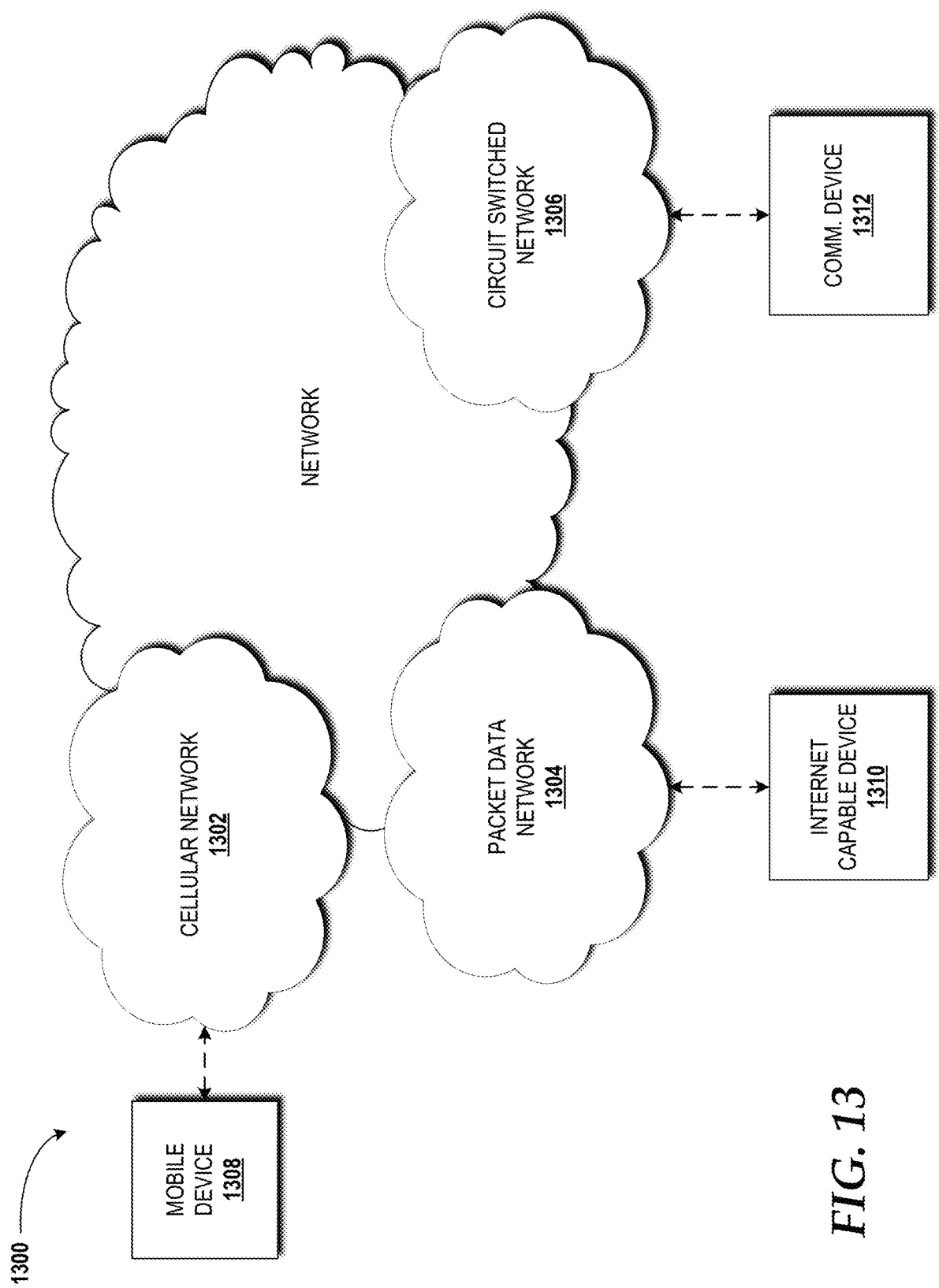
FIG. 13 is a diagram illustrating a network, according to an illustrative embodiment.

Turning now to FIG. 13, details of a network 1300 are illustrated, according to an illustrative embodiment. The network 1300 includes a cellular network 1302, a packet data network 1304, for example, the Internet, and a circuit switched network 1306, for example, a PSTN. The cellular network 1302 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1302 also includes radios and nodes for receiving and transmitting voice, video data, and combinations thereof to and from radio transceivers, networks, the packet data network 1304, and the circuit switched network 1306.

A mobile communications device 1308, such as, for example, a cellular telephone, a user equipment, a mobile terminal, a PDA, a laptop computer, a handheld computer, and combinations thereof, can be operatively connected to the cellular network 1302. The cellular network 1302 can be configured as a 2G GSM network and can provide data communications via GPRS and/or EDGE. Additionally, or alternatively, the cellular network 1302 can be configured as a 3G UMTS network and can provide data communications via the HSPA protocol family, for example, HSDPA, EUL (also referred to as HSUPA), and HSPA+. The cellular network 1302 also is compatible with 4G mobile communications standards such as LTE, or the like, as well as evolved and future mobile standards.

The packet data network 1304 includes various devices, for example, servers, computers, databases, routers, packet gateways, and other devices in communication with another, as is generally known. The packet data network 1304 can be or can include the network(s) 117 that provide connectivity to the cloud environment(s) 114 illustrated and described with reference to FIG. 1. The packet data network 1304 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1304 includes or is in communication with the Internet. The circuit switched network 1306 includes various hardware and software for providing circuit switched communications. The circuit switched network 1306 may include, or may be, what is often referred to as a POTS. The functionality of a circuit switched network 1306 or other circuit-switched network are generally known and will not be described herein in detail.

The illustrated cellular network 1302 is shown in communication with the packet data network 1304 and a circuit switched network 1306, though it should be appreciated that this is not necessarily the case. One or more Internet-capable devices 1310, for example, a PC, a laptop, a portable device, or another suitable device, can communicate with one or more cellular networks 1302, and devices connected thereto, through the packet data network 1304. It also should be appreciated that the Internet-capable device 1310 can communicate with the packet data network 1304 through the circuit switched network 1306, the cellular network 1302, and/or via other networks (not illustrated).

As illustrated, a communications device 1312, for example, a telephone, facsimile machine, modem, computer, or the like, can be in communication with the circuit switched network 1306, and therethrough to the packet data network 1304 and/or the cellular network 1302. It should be appreciated that the communications device 1312 can be an Internet-capable device, and can be substantially similar to the Internet-capable device 1310. In the specification, the network is used to refer broadly to any combination of the networks 1302, 1304, 1306.

Based on the foregoing, it should be appreciated that concepts and technologies directed to intelligent preventative maintenance of critical applications in cloud environments have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. An intelligent preventative maintenance architecture for maintaining a plurality of cloud components operating within a cloud computing environment, the intelligent preventative maintenance architecture comprising:
   a plurality of frameworks comprising a preventative framework, an execution framework, and an engineering framework, wherein the preventative framework is in communication with the engineering framework and the execution framework via a data movement platform comprising a plurality of application programming interfaces that enable communications among the plurality of frameworks;

a processor; and a memory comprising instructions for a predictive failure analysis module of the preventative framework that, when executed by the processor, cause the processor to perform predictive failure analysis operations comprising monitoring a health of at least a portion of the plurality of cloud components operating within the cloud computing environment, wherein at least the portion of the plurality of cloud components hosts a mission critical application, receiving, from the engineering framework via the data movement platform, sensor data, wherein the sensor data comprises environmental data associated with environmental characteristics of the cloud computing environment and cloud component data associated with operational characteristics of at least the portion of the plurality of cloud components operating within the cloud computing environment, analyzing the sensor data to detect an abnormal pattern within the sensor data, determining a root cause of the abnormal pattern, and predicting a probability of a failure of at least one cloud component of the plurality of cloud components.

2. The intelligent preventative maintenance architecture of claim 1, wherein determining the root cause of the abnormal pattern comprises determining the root cause of the abnormal pattern based, at least in part, upon a big data analytics process.

3. The intelligent preventative maintenance architecture of claim 1, wherein determining the root cause of the abnormal pattern comprises determining the root cause of the abnormal pattern based, at least in part, upon a machine learning process.

4. The intelligent preventative maintenance architecture of claim 1, wherein the memory further comprises instructions for a proactive operational adjustment module that, when executed by the processor, cause the processor to perform proactive operational adjustment operations comprising:

performing an operational adjustment to the at least one cloud component of the plurality of cloud components based, at least in part, upon the root cause of the abnormal pattern and the probability of the failure;

creating a policy that governs an initial homing and placement of a new mission critical application to be hosted by at least a further portion of the plurality of cloud components operating within the cloud computing environment based, at least in part, upon a mission critical factor associated with the new mission critical application;

fine tuning the policy based, at least in part, upon results of a failure history analysis and a machine learning process; and determining a maintenance schedule for the further portion of the plurality of cloud components operating within the cloud computing environment.

5. The intelligent preventative maintenance architecture of claim 1, wherein the memory further comprises instructions for a preemptive mission critical hardening module that, when executed by the processor, cause the processor to perform preemptive mission critical application hardening operations comprising moving the mission critical application from the portion of the plurality of cloud components to a further portion of the plurality of cloud components.

6. The intelligent preventative maintenance architecture of claim 1, wherein the memory further comprises instructions for a preemptive mission critical hardening module that, when executed by the processor, cause the processor to perform preemptive mission critical application hardening operations comprising moving the mission critical application from the portion of the plurality of cloud components operating within the cloud computing environment to a portion of a further plurality of cloud components operating within a further cloud computing environment.

7. The intelligent preventative maintenance architecture of claim 1, wherein the memory further comprises instructions for a preemptive mission critical hardening module that, when executed by the processor, cause the processor to perform preemptive mission critical application hardening operations comprising redeploying the mission critical application to at least a further portion of the plurality of cloud components operating within the cloud computing environment.

8. The intelligent preventative maintenance architecture of claim 7, wherein redeploying the mission critical application to at least the further portion of the plurality of cloud components operating within the cloud computing environment comprises redeploying the mission critical application to at least the further portion of the plurality of cloud components operating within the cloud computing environment during a maintenance window.

9. A method comprising:

monitoring, by a processor of an intelligent preventative maintenance architecture via execution of a predictive failure analysis module of a preventative framework, a health of at least a portion of a plurality of cloud components operating within a cloud computing environment, wherein at least the portion of the plurality of cloud components hosts a mission critical application, and wherein the preventative framework is in communication with an engineering framework and an execution framework via a data movement platform comprising a plurality of application programming interfaces that enable communications among the preventative framework, the engineering framework, and the execution framework;

receiving, by the processor of the intelligent preventative maintenance architecture via execution of the predictive failure analysis module, from the engineering framework via the data movement platform, sensor data comprising environmental data associated with environmental characteristics of the cloud computing environment and cloud component data associated with operational characteristics of at least the portion of the plurality of cloud components within the cloud computing environment;

analyzing, by the processor of the intelligent preventative maintenance architecture via execution of the predictive failure analysis module, the sensor data to detect an abnormal pattern within the sensor data;

determining, by the processor of the intelligent preventative maintenance architecture via execution of the predictive failure analysis module, a root cause of the abnormal pattern; and predicting, by the processor of the intelligent preventative maintenance architecture via execution of the predictive failure analysis module, a probability of a failure of at least one cloud component of the plurality of cloud components.

10. The method of claim 9, wherein determining, by the processor of the intelligent preventative maintenance architecture via execution of the predictive failure analysis module, the root cause of the abnormal pattern comprises determining, by the processor of the intelligent preventative maintenance architecture via execution of the predictive failure analysis module, the root cause of the abnormal pattern based, at least in part, upon a big data analytics process.

11. The method of claim 9, wherein determining, by the processor of the intelligent preventative maintenance architecture via execution of the predictive failure analysis module, the root cause of the abnormal pattern comprises determining, by the processor of the intelligent preventative maintenance architecture via execution of the predictive failure analysis module, the root cause of the abnormal pattern based, at least in part, upon a machine learning process.

12. The method of claim 9, further comprising:
performing, by the processor of the intelligent preventative maintenance architecture via execution of a proactive operational adjustment module of the preventative framework, an operational adjustment to the at least one cloud component of the plurality of cloud components based, at least in part, upon the root cause of the abnormal pattern and the probability of the failure;
creating, by the processor of the intelligent preventative maintenance architecture via execution of the proactive operational adjustment module, a policy that governs an initial homing and placement of a new mission critical application to be hosted by at least a further portion of the plurality of cloud components operating within the cloud computing environment based, at least in part, upon a mission critical factor associated with the new mission critical application;
fine tuning, by the processor of the intelligent preventative maintenance architecture via execution of the proactive operational adjustment module, the policy based, at least in part, upon results of a failure history analysis and a machine learning process; and
determining, by the processor of the intelligent preventative maintenance architecture via execution of the proactive operational adjustment module, a maintenance schedule for the further portion of the plurality of cloud components operating within the cloud computing environment.

13. The method of claim 9, further comprising moving, by the processor of the intelligent preventative maintenance architecture via execution of a preemptive mission critical hardening module, the mission critical application from the portion of the plurality of cloud components to a further portion of the plurality of cloud components.

14. The method of claim 9, further comprising moving, by the processor of the intelligent preventative maintenance architecture via execution of a preemptive mission critical hardening module, the mission critical application from the portion of the plurality of cloud components operating within the cloud computing environment to a portion of a further plurality of cloud components operating within a further cloud computing environment.

15. The method of claim 9, further comprising redeploying, by the processor of the intelligent preventative maintenance architecture via execution of the preemptive mission critical hardening module, the mission critical application to at least a further portion of the plurality of cloud components operating within the cloud computing environment.

16. The method of claim 15, wherein redeploying, by the processor of the intelligent preventative maintenance architecture via execution of a preemptive mission critical hardening module, the mission critical application to at least the further portion of the plurality of cloud components operating within the cloud computing environment comprises redeploying, by the processor of the intelligent preventative maintenance architecture via execution of the preemptive mission critical hardening module, the mission critical application to at least the further portion of the plurality of cloud components operating within the cloud computing environment during a maintenance window.

17. A computer-readable storage medium comprising computer-executable instructions that, when executed by a processor of an intelligent preventative maintenance architecture, causes the intelligent preventative maintenance architecture to perform operations comprising: monitoring a health of at least a portion of a plurality of cloud components operating within a cloud computing environment, wherein at least the portion of the plurality of cloud components hosts a mission critical application; receiving sensor data from an engineering framework of a plurality of logical frameworks, wherein the sensor data comprising environmental data associated with environmental characteristics of the cloud computing environment and cloud component data associated with operational characteristics of at least a portion of the plurality of cloud components operating within the cloud computing environment; analyzing the sensor data to detect an abnormal pattern within the sensor data; determining a root cause of the abnormal pattern; and predicting a probability of a failure of at least one cloud component of the plurality of cloud components.

18. The computer-readable storage medium of claim 17, wherein the operations further comprise: performing an operational adjustment to the at least one cloud component of the plurality of cloud components based, at least in part, upon the root cause of the abnormal pattern and the probability of the failure; creating a policy that governs an initial homing and placement of a new mission critical application to be hosted by at least a further portion of the plurality of cloud components operating within the cloud computing environment based, at least in part, upon a mission critical factor associated with the new mission critical application; fine tuning the policy based, at least in part, upon results of a failure history analysis and a machine learning process; and determining a maintenance schedule for the further portion of the plurality of cloud components operating within the cloud computing environment.

19. The computer-readable storage medium of claim 17, wherein the operations further comprise moving the mission critical application from the portion of the plurality of cloud components to a further portion of the plurality of cloud components or to a portion of a further plurality of cloud components operating within a further cloud computing environment.

20. The computer-readable storage medium of claim 17, wherein the operations further comprise redeploying the mission critical application to at least a further portion of the plurality of cloud components operating within the cloud computing environment.

* * * * *